United States Patent
Krebs et al.

(10) Patent No.: US 10,272,493 B2
(45) Date of Patent: Apr. 30, 2019

(54) MACHINE FOR GRINDING A WORK-PIECE CUSTOMIZED BY ADDITIVE MANUFACTURING

(71) Applicant: AKTIEBOLAGET SKF, Göteborg (SE)

(72) Inventors: Philipp Krebs, Nieuwegein (NL); Sebastian Ziegler, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/105,184

(22) PCT Filed: Dec. 18, 2014

(86) PCT No.: PCT/EP2014/078522
§ 371 (c)(1),
(2) Date: Jun. 16, 2016

(87) PCT Pub. No.: WO2015/091837
PCT Pub. Date: Jun. 25, 2015

(65) Prior Publication Data
US 2016/0311022 A1    Oct. 27, 2016

(30) Foreign Application Priority Data
Dec. 18, 2013   (GB) .................................. 1322421.7

(51) Int. Cl.
*B22F 3/105*   (2006.01)
*B23B 3/06*    (2006.01)
(Continued)

(52) U.S. Cl.
CPC .............. *B22F 3/1055* (2013.01); *B22F 3/24* (2013.01); *B23B 3/065* (2013.01); *B23K 26/342* (2015.10);
(Continued)

(58) Field of Classification Search
CPC .............. B29C 67/007; B29C 67/0066; B29C 67/0062; B29C 67/0088; B29C 67/0055;
(Continued)

(56) References Cited

U.S. PATENT DOCUMENTS

| 7,020,539 B1 | 3/2006 | Kovacevic et al. | |
| 2010/0196526 A1* | 8/2010 | Yasukochi | B29C 67/0066 425/174.4 |

(Continued)

FOREIGN PATENT DOCUMENTS

| DE | 102010020158 A1 | 11/2011 |
| EP | 0967067 A1 | 12/1999 |

*Primary Examiner* — Joseph S Del Sole
*Assistant Examiner* — Mohamed K Ahmed Ali
(74) *Attorney, Agent, or Firm* — Bryan Peckjian; SKF USA Inc. Patent Dept.

(57) ABSTRACT

The invention provides a machine for grinding a work-piece using a grinding tool. The machine comprises a motor for rotating a spindle having a work-piece holder for holding the work-piece. The machine further provides a tool post for mounting and maneuvering the grinding tool relative to the work-piece. The machine includes a print system for printing printable material to the work-piece via additive manufacturing. The printed material may be used to customize a shape of the work-piece after the work-piece has been grinded or turned in the machine. This combination allows for a reduced machine footprint and increased product accuracy.

18 Claims, 5 Drawing Sheets

(51) Int. Cl.
- *B23K 26/342* (2014.01)
- *B23K 26/70* (2014.01)
- *B24B 27/00* (2006.01)
- *B29C 69/00* (2006.01)
- *B33Y 30/00* (2015.01)
- *B33Y 40/00* (2015.01)
- *B33Y 50/02* (2015.01)
- *B22F 3/24* (2006.01)
- *F16C 33/64* (2006.01)
- *B29C 64/00* (2017.01)
- *B29C 64/20* (2017.01)
- *B33Y 80/00* (2015.01)

(52) U.S. Cl.
CPC ............ *B23K 26/702* (2015.10); *B24B 27/00* (2013.01); *B29C 64/00* (2017.08); *B29C 64/20* (2017.08); *B29C 69/001* (2013.01); *B33Y 30/00* (2014.12); *B33Y 40/00* (2014.12); *B33Y 50/02* (2014.12); *F16C 33/64* (2013.01); *B22F 2003/1056* (2013.01); *B22F 2003/1057* (2013.01); *B22F 2003/247* (2013.01); *B33Y 80/00* (2014.12); *Y02P 10/295* (2015.11)

(58) Field of Classification Search
CPC ..... B29C 67/0059; B33Y 40/00; B33Y 30/00; B33Y 50/02
See application file for complete search history.

(56) References Cited

U.S. PATENT DOCUMENTS

| | | | |
|---|---|---|---|
| 2010/0310786 A1* | 12/2010 | Dunne | A61C 13/0004 427/487 |
| 2013/0189435 A1 | 7/2013 | Mackie | |
| 2013/0295338 A1* | 11/2013 | Keating | B29C 67/0055 428/174 |

* cited by examiner

MACHINE FOR GRINDING A WORK-PIECE CUSTOMIZED BY ADDITIVE MANUFACTURING

CROSS-REFERENCE

This application is the U.S. national stage of International Application No. PCT/EP2014/078522 filed on Dec. 18, 2014, which claims the benefit of priority to Great Britain Patent Application No. 1322421.7, filed on Dec. 18, 2013.

FIELD OF THE INVENTION

The invention relates to a machine for grinding a work-piece using a grinding tool.

BACKGROUND OF THE INVENTION

A machine is a well-known tool for performing a grinding operation or turning operation on a work-piece. The machine comprises a motor for rotating a spindle which is connected to a work-piece holder holding the work-piece. The grinding or turning operation is typically performed using a grinding tool which is mounted on a tool post. The tool post maneuvers the grinding tool relative to the work-piece, which during operation typically rotates. During operation, the grinding tool cuts into the work-piece via a helical path for shaping the work-piece.

The machine is often used in a model shop to generate customized work-pieces, such as generating customized inner rings and/or outer rings for bearings. However, the grinding process is relatively expensive and time consuming and typically only results in rotational symmetrical solutions. To produce a real customized work-piece, also other manufacturing processes are available in such model shop.

One of these additional manufacturing processes may, for example, be an additive manufacturing or more commonly called 3D printing. Also this process is a relatively well known production technique in which a three-dimensional solid object is generated from a digital model. The process of additive manufacturing starts with generating the digital model via any known digital modeling methods, such as using a CAD program. Next, the digital model is divided into slices in which each slice indicates for this layer of the digital model where the printed material should be located. The individual slices are sequentially fed into an additive manufacturing tool or 3D printer which deposits the material according to the individual slices and as such generates the complete three-dimensional solid object layer by layer.

In the early days of additive manufacturing, mainly plastic materials or resins have been used as printed material for generating the three-dimensional solid object, but other processes have been developed in which also other materials, including different types of metal may be deposited in layers using this additive manufacturing technique. A major benefit of this manufacturing technique is that it allows the designer to produce virtually any three-dimensional object in a relatively simple production method. This may be especially beneficial when, for example, an initial model is required of a product—such as it is done in a model shop—or when only a limited number of products are required.

The use of additive manufacturing in a model shop, for example, to produce bearings is expanding which poses additional challenges to maintain the high accuracy required for bearings.

BRIEF SUMMARY OF THE INVENTION

One of the objects of the invention is to expand the usability of a machine.

A first aspect of the invention provides a machine for grinding a work-piece using a grinding tool. Embodiments are defined in the dependent claims.

The machine in accordance with the first aspect of the invention comprises a motor for rotating a spindle comprising a work-piece holder for holding the work-piece. The machine comprises a tool post for mounting and maneuvering the grinding tool relative to the work-piece. The machine further comprises a print system for printing printable material to the work-piece via additive manufacturing.

The inventors have realized that new production processes may require a combination of both the grinding process of the machine together with the additive manufacturing to add additional functionality to the grinded work-piece. A good example may be rings for use in bearings. These rings require a mechanically strong raceway surface which is in contact and guides the rolling elements, while the remainder of the ring for the bearing may have any shape required by a customer. This mechanically strong raceway surface typically is produced using a turning process in a machine because the rotational symmetry of the raceway surface is very important in a bearing. However, the remainder of the ring may be produced using another manufacturing technique, for example this additive manufacturing. In the known model shop, the work-piece or the half-finished ring for the bearing had to be removed from the machine and positioned accurately into a 3D printing tool to customize the remainder of the ring. This accurately replacement of the half-finished ring for the bearing requires a significant amount of time. Furthermore, there is always some residual error in the accurate placement of the half-finished ring into the 3D printing tool which typically is not preferred. Also calibration differences between the positioning systems of the different tools may be significant and further reduce the accuracy of the production process. Finally the use of the additional 3D printing tool in the model shop increases the machine footprint in the model shop or factory. The machine according to the invention comprises a print system, for example, a print head for printing printable material to the work-piece. Due to this combination of machine with a 3D printing tool, the overall footprint of the factory may be reduce, but also the overall accuracy of the work-piece which is produced via a combination of both a turning process and an additive manufacturing process is significantly improved. Furthermore, a reduction of production time is achieved due to the fact that the work-piece does not have to be removed from the machine and accurately positioned in a 3D printing tool.

A further benefit of the machine according to the invention is that a further rotational process may be used to process the printed material printed on the work-piece. Currently, the printed material has a granular structure which may not be preferred for some surfaces of the work-piece. The fact that the work-piece remains inside the machine also for the additive manufacturing process, allows for, for example, a further grinding or polishing step after the printed material has been applied. This grinding or polishing step may again be performed very accurate, because the work-piece remains inside the work-piece holder during the whole manufacturing process.

The printing or depositing of printable material using the print system or print head may be done using gravitational force via which droplets of liquid printable material or via which granulates of solid material are deposited on to the work-piece. In such an embodiment, the print system further comprises a laser source which irradiates the droplet or granulate as soon as it reaches the required position on the work-piece. Alternatively, the printable material may be ejected from the print system, for example, similar to an ejection of ink from an inkjet printer.

In an embodiment of the machine, the print system is configured and constructed for printing printable material to the work-piece while, in use, the work-piece remains connected to the work-piece holder. As indicated already, the accuracy of the shapes and dimensions of the work-piece are significantly improved when the work-piece may remain in the same work-piece holder during both the grinding and the additive manufacturing process. This is due to calibration differences between tools when the work-piece has to be moved from one to the other, and due to positioning differences which may occur when changing from one tool to another. The machine according to the invention is able to also provide the additive manufacturing process thus reducing the need to change tools.

In an embodiment of the machine, the machine comprises a positioning arm for positioning at least a part of the print system relative to the work-piece. The additive manufacturing technique may require quite some flexibility in the positioning of the print system or print head. Often this flexibility is not provided in the standard tool post in the known machine tools. As such, an additional arm for positioning at least a part of the print system, for example, the print head relative to the work-piece would allow to, for example, retrofit existing machine tools with the additive manufacturing possibility. Furthermore, some additive manufacturing processes use gravitational force to deposit the printable material onto the work-piece. To achieve this, the print head has to be positioned, in use, substantially vertically above the work-piece, which is not feasible using the known tool posts of the known machine tools.

In an embodiment of the machine, the tool post is configured and constructed for also mounting and maneuvering at least a part of the print system. In this embodiment, the tool post is configured for maneuvering at least the part of the print system, for example, the print head. In such a case, the coordinate system which is associated with the tool post and used during the grinding process will be the same as used during the additive manufacturing process, which further improves the accuracy of the dual manufacturing processes. Only a single calibration of the coordinate system is necessary to achieve overall best accuracy.

In an embodiment of the machine, at least a part of the print system is removably attached to the tool post. This removing or replacing of the grinding tool by the at least part of the print system—for example, the print head—may be done automatically using a movable arm or robot arm. Alternatively, the tool post may have some kind of revolving system which enables the replacement of the grinding tool by the print head.

In an embodiment of the machine, the machine is configured and constructed to position at least a part of the print system, in use, vertically above the work-piece for adding the printable material to the work-piece. As indicted before, some additive manufacturing processes deposit the liquid printable material or the granulated solid printable material using gravity—which requires the depositing part of the print system (for example, the print head) to be located vertically above the work-piece, in use.

In an embodiment of the machine, the machine comprises a controller for controlling the motor for controlling a rotating of the work-piece in dependence of the additive manufacturing process. The controlling of the motor required for additive manufacturing process may be for a completely different range than usually required for the grinding or turning process. During the additive manufacturing the controller may require to control the rotation of the work-piece down to almost zero revolutions per minute. In an embodiment, the machine may have a single controller able to control the rotation of the work-piece for both the grinding and/or turning process and for the additive manufacturing process.

In an embodiment of the machine, the controller controls the motor for applying a step-wise rotation of the work-piece. This step-wise rotation may be used to generate a non-circular structure using the additive manufacturing process at sufficient accuractely.

In an embodiment of the machine, the machine further comprises an angular position sensor coupled to the controller for sensing, in use, an angular position of the work-piece in dependence of the additive manufacturing. The machine according to the invention may comprise a first angular position sensor used during the grinding or turning process and a second angular position sensor during the additive manufacturing process. This might be beneficial in view of the different working modes: the first angular position sensor needs to be accurate at high speed, while the second angular position sensor needs to be accurate at very low speed. These different requirements may not be combined in a single angular position sensor. However, if these requirements may be combined in a single angular position sensor, this may be preferred from a cost perspective.

In an embodiment of the machine, the machine comprises an absolute positioning system for positioning at least a part of the print system relative to the work-piece. The part of the print system may, for example, be the print head.

In an embodiment of the machine, the machine comprises a compartment for generating a controlled environment inside the compartment, in use, at least a part of the print system being located in the compartment for applying the additive manufacturing to the work-piece in the controlled environment. Some of the additive manufacturing processes may require a controlled environment due to hazardous fluids than may be produced during the process or due to contaminations in the air which need to be avoided to not get implemented into the work-piece during the additive manufacturing process.

In an embodiment of the machine, the machine comprises a container comprising the printable material, the container being configured and constructed for immersing the work-piece at least partially with the printable material. This container may comprise liquid printable material or may comprise granulated solid printable material. The additive manufacturing process may be performed by illuminating part of the printable material layer with intense light, for example, laser light, such that the printable material particles are melted or such that the printable material liquid is locally cured.

In an embodiment of the machine, the controller is configured and constructed for controlling the printing of the print system and for controlling the positioning of at least a part of the print system relative to the work-piece. A single controller both for controlling the turning or grinding process and for controlling the additive manufacturing or 3D printing process.

In an embodiment of the machine, the machine comprises surface treatment means for cleaning a surface of the work-piece before, in use, applying the printable material. This may be beneficial when the turning or grinding process is not a hard turning or hard grinding process. Typically, such hard turning processes do not require cooling fluids. As such, the work-piece may immediately be used for the additive manufacturing process without extensive cleaning. However, for many other grinding processes, specific cooling or grinding fluids may be used which typically require cleaning before a layer of printable material may be applied to the outer wall of the work-piece via the additive manufacturing process. In an embodiment of the machine, the lathe comprises surface treatment means for roughening the surface of the work-piece, in use, before applying the printable material to the work-piece. This roughening of the surface may generate attachment elements which improve the bonding between the surface of the work-piece and the printed material. In an embodiment of the machine, the machine comprises surface treatment means for coating at least a part of the surface of the work-piece before, in use, applying the printable material. Also this coating may act as an attachment element which may be used to improve the bonding between the work-piece and the printed material added during the additive manufacturing process.

In an embodiment of the machine, the machine comprises a feed for providing the printable material to the print head. Such feed may be used to provide a liquid printable material to the print head, or may be used to provide granulated solid particles of printable material to the print head. The use of this feed allows that the dimensions and the weight of the print head remain limited. This is beneficial for the dimensioning of a positioning arm for positioning the print head relative to the work-piece.

In an embodiment of the machine, the print system is configured for applying the additive manufacturing selected from a list comprising stereo-lithography, selective laser sintering, selective laser melting, laminated object manufacturing, fused deposition modeling, selective binding, laser engineering net shaping, photo polymerization, direct laser deposition (preferred) and selective electron beam sintering.

In an embodiment of the machine, the machine is configured and constructed for applying a hard-turning or hard-boring process to the work-piece.

In an embodiment of the machine, the print system is configured for printing printable material chosen from a list comprising steel, stainless steel, maraging steel, tool steel, low alloy steel, copper alloys, nickel alloys, cobalt alloys, aluminum, aluminum alloys, titanium, titanium alloys.

BRIEF DESCRIPTION OF THE SEVERAL VIEWS OF THE DRAWING

These and other aspects of the invention are apparent from and will be elucidated with reference to the embodiments described hereinafter. In the drawings.

DETAILED DESCRIPTION OF THE INVENTION

Figure 1:
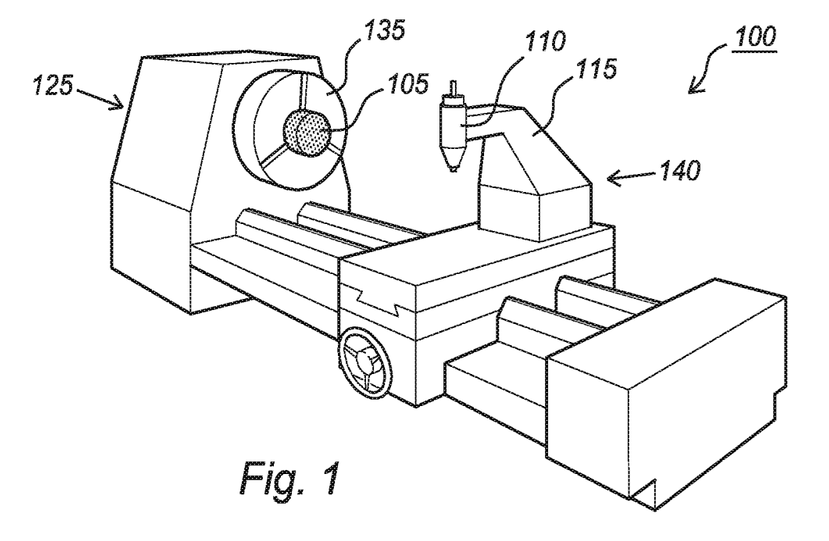
FIG. 1 shows a plan view of a machine according to the invention.
Figure 2A:
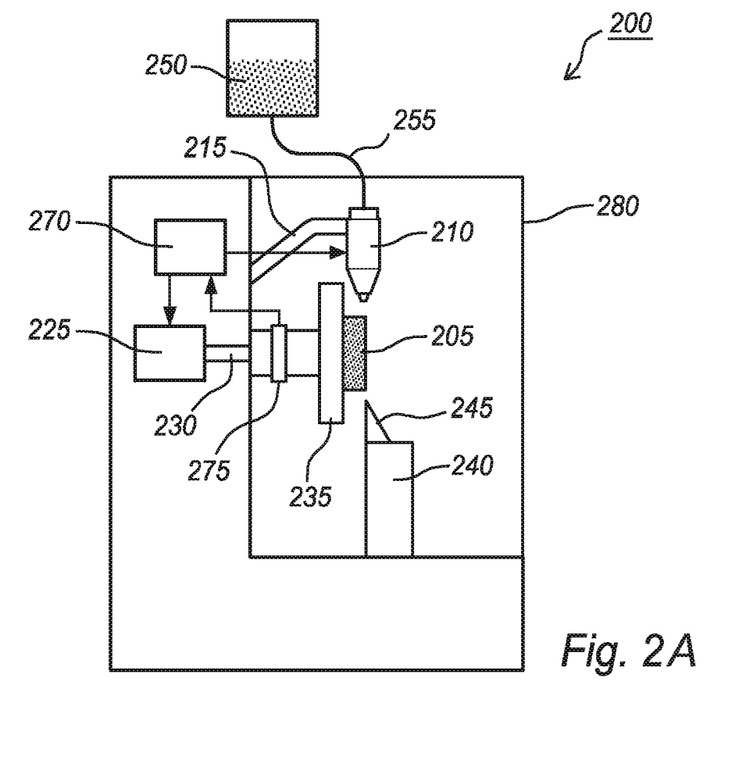
FIG. 2A shows a cross-sectional view of a second embodiment of a machine according to the invention.

FIG. 1 shows a plan view of a machine 100 according to the invention. The machine 100 shown in FIG. 1 comprises a motor 125 arranged in a housing for driving a work-piece holder 135 for rotating the work-piece 105. The machine 100 further comprises a tool post 140 for positioning the grinding tool 245 (see FIG. 2) relative to the work-piece 105. The tool post 140 is mounted on a positioning mechanism for positioning the tool post 140 parallel to the rotational axis of the work-piece holder 135 and is mounted on a further positioning mechanism for positioning the tool post 140 perpendicular to the rotational axis of the work-piece holder 135. The tool post 140 is further configured for mounting at least a part of a printing system 110, for example, the print head 110 onto the tool post 140. This print head 110 may, for example, apply the 3D printing process on the work-piece 105.

In an embodiment of the machine 100, the print head 110 is attached to the tool post 140 via a positioning arm 115. This positioning arm 115 may be used to enable a positioning of the print head 110 substantially around the work-piece 105 for applying the additive printing process substantially fully around the work-piece 105. The print head 110 may be replaceably attached to the tool post 140, preferably via the positioning arm 115. This allows the replacement of the grinding tool 245 by the print head 110 such that the same coordinate system used for positioning the grinding tool 245 with respect to the work-piece 105 may be used to also position the print head 110 relative to the work-piece 105. This use of the same positioning system enables a more accurate positioning of the printed material on the work-piece 105.

FIG. 2A shows a cross-sectional view of a second embodiment of a machine 200 according to the invention. In this cross-sectional view, again the motor 225 and the work-piece holder 235 are shown, together with the tool post 240 for holding the grinding tool 245 and positioning the grinding tool 245 relative to the work-piece 205. In this cross-sectional view, also the spindle 230 is shown which is rotated by the motor 225 and to which the work-piece holder 235 comprising the work-piece 205 is attached. A difference with the embodiment shown in FIG. 1 is that the embodiment shown in FIG. 2A comprises a print head 210 which is connected via the positioning arm 215 which is separate from the tool post 240. A benefit of this arrangement is that the positioning arm 215 may be arranged closer to the work-piece 205 and may be positioned such that the print head 210 may be located, in use, at a position vertical above the work-piece 205 such that the printable material 250 may be deposited. The print head 210 is connected via a feed 255 with a container comprising the printable material 250. This printable material 250 may be a liquid printable material, such as a resin, which is dispensed or ejected from the print head 210 toward the work-piece 205. The print head 210 may further be configured to emit a laser beam from a laser source (not shown) arranged on the print head 210 or located remote and guided to the print head 210 via a fiber glass light guide (not shown). A controller 270 controls the emission of the laser beam from the print head 210 towards the work-piece 205 to cure the resin at the moment it contacts the work-piece 205. Alternatively, the printed material 250 may be granulated solid particles of printable material which are dispensed or ejected from the print head 210 towards the work-piece 205. The controller 270 again controls the emission of the laser beam from the print head 210 towards the work-piece 205 to sinter or melt the granulated solid particles of printable material at the moment they contact the work-piece 205. In the cross-sectional view of FIG. 2A the controller 270 is connected to the motor 225 and to the print head 210 for controlling the motion of the print head 210 and of the motor 225 (and thus the rotation of the work-piece 205) depending on the additive manufacturing process. The machine 200 as shown in FIG. 2A further comprises an angular position sensor 275 which is connected with the controller 270 for providing positioning information of the work-piece 205 towards the controller 270. This angular positioning sensor 275 may be used to accurately position the work-piece 205 relative to the print head 210 during the additive manufacturing process.

The machine 200 according to the invention and as shown in FIG. 2A comprises a compartment 280 for generating a controlled environment inside the compartment 280. When applying the additive manufacturing process, the print head 210 is located in the compartment for applying the additive manufacturing to the work-piece 205 in the controlled environment. Some of the additive manufacturing processes may require a controlled environment due to hazardous fluids than may be produced during the process. Alternatively, the controlled environment may be required or preferred to avoid contaminations which may be present in ambient air to be implemented into the work-piece 205 during the additive manufacturing process.

Figure 2B:
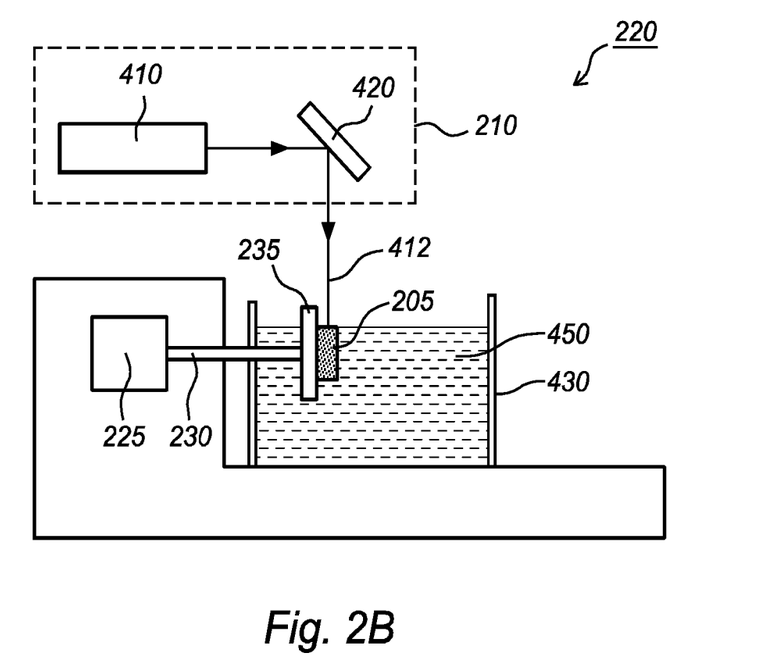
FIG. 2B shows a cross-sectional view of a third embodiment of the machine according to the invention.

FIG. 2B shows a cross-sectional view of a third embodiment of the machine 220 according to the invention. The machine 220 as shown in FIG. 2B comprises the printing system 210, now comprising a laser 410 emitting a laser beam 412 via a scanning mirror 420. Again, the motor 225, spindle 230 and work-piece holder 235 with the work-piece 205 are shown similar as the machine 200 of FIG. 2A. Now, a resin container 430 comprising the printable material 450 in the form of a liquid resin 450 is present for performing the additive manufacturing process. The process of 3D printing is similar as explained in more detail with respect to FIG. 4A. Of course alternative to the liquid resin 450 as printable material 450, the container 430 may also comprise granulated solid particles of printable material 550 as the printable material 550, similar as shown in more detail with respect to FIG. 5A.

Figure 3:
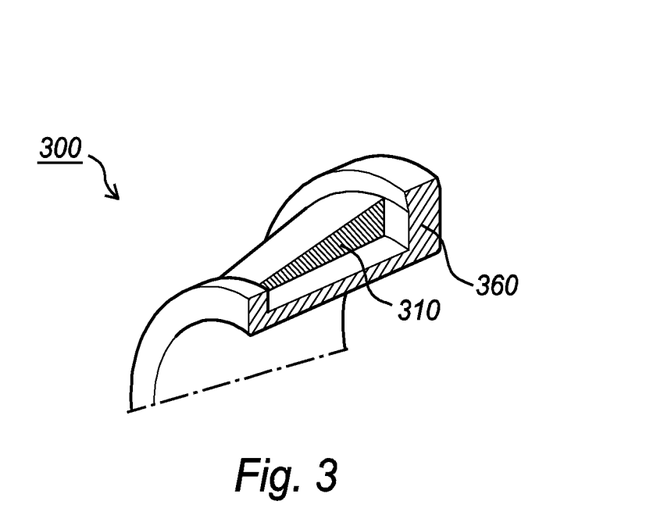
FIG. 3 shows a cross-sectional view of an inner ring for a bearing in which the inner ring has been produced using both a hard turning process and an additive manufacturing process.

FIG. 3 shows a cross-sectional view of a work-piece 300 being an inner ring 300 for a bearing (not shown) in which the inner ring 300 has been produced using both a hard turning process and an additive manufacturing process. The inner ring 300 comprises a raceway surface 310 which typically comprises a hardened steel surface 310 for guiding the rolling elements (not shown) of a bearing. Such guiding surface for the rolling elements should be able to withstand significant strain and stress caused by the rolling elements in use. As such, this surface is preferably produced from hardened steel. Shaping this raceway surface 310 may be done using the hard turning process. Especially in the embodiment shown in FIG. 3, the raceway surface 310 is machined to have an angle of inclination relative to a rotational axis of the bearing. Such inclination angle is typically applied when the bearing has to withstand radial forces which act upon the bearing in use. Using the hard turning process of the machine 100, 200, 220 according to the invention allows an accurate machining of the raceway surface 310. Next, the machine 100, 200, 220 according to the invention is used to add printed material 360 to generate a specific shape to the inner ring 300, for example, to fit a shaft or rod. In the inner ring 300 shown in FIG. 3, the printed material 360 constitutes a flange 360 which is used to withstand a power component acting upon the rolling elements in a direction substantially parallel to the rotational axis. Due to the use of the machine 100, 200, 220 according to the invention, the accuracy of the inner ring 300 manufactured using both processes is significantly improved.

Figure 4A:
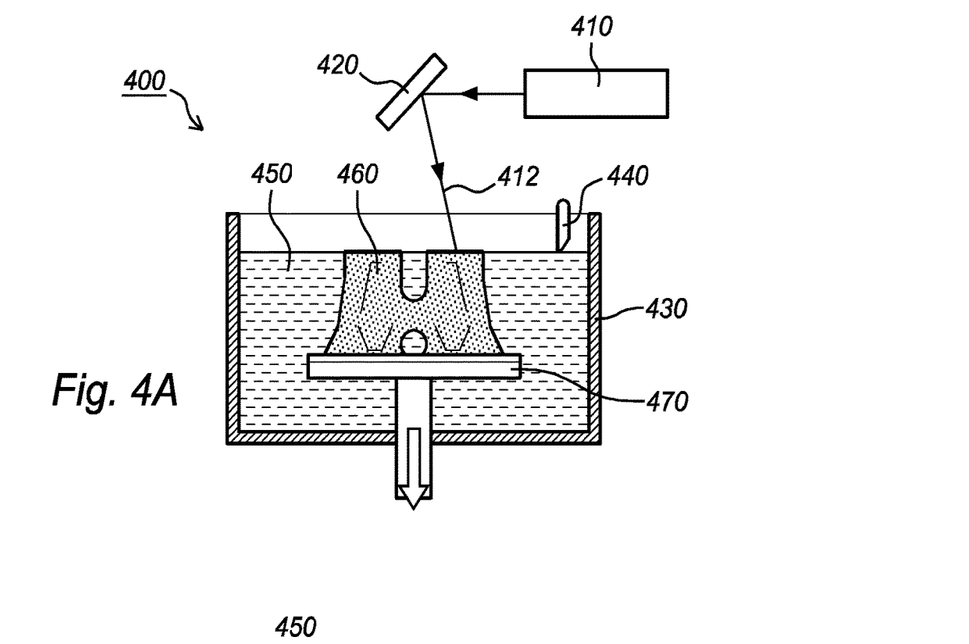
FIG. 4A shows a first embodiment of an additive manufacturing tool in which a liquid resin is used for applying the printed material in the additive manufacturing process.

FIG. 4A shows a first embodiment of an additive manufacturing tool 400 in which a liquid resin 450 is used for applying the printed material 460 in the additive manufacturing process. The additive manufacturing tool 400 shown in FIG. 4A may constitute the print system 110, 210 as shown in FIGS. 1 and 2. Such additive manufacturing tool 400 comprises resin container 430 comprising the liquid resin 450. Inside the resin container 430 a platform 470 is positioned which is configured to slowly move down into the resin container 430. The additive manufacturing tool 400 further comprises a laser 410 which emits a laser beam 412 having a wavelength for curing the liquid resin 450 at the locations on the printed material 460 where additional printed material 460 should be added. A re-coating bar 440 is drawn over the printed material 460 before a new layer of printed material 460 is to be applied to ensure that a thin layer of liquid resin 450 is on top of the printed material 460. Emitting using the laser 410 those parts of the thin layer of liquid resin 450 where the additional printed material 460 should be applied will locally cure the resin 450. In the embodiment as shown in FIG. 4A the laser beam 412 is reflected across the layer of liquid resin 450 using a scanning mirror 420. When in the current layer all parts that need to be cured, have been illuminated with the laser beam 412, the platform 470 lowers the printed material 460 further into the liquid resin 450 to allow the re-coating bar 460 to apply another layer of liquid resin 450 on top of the printed material 460 to continue the additive manufacturing process.

Figure 4B:
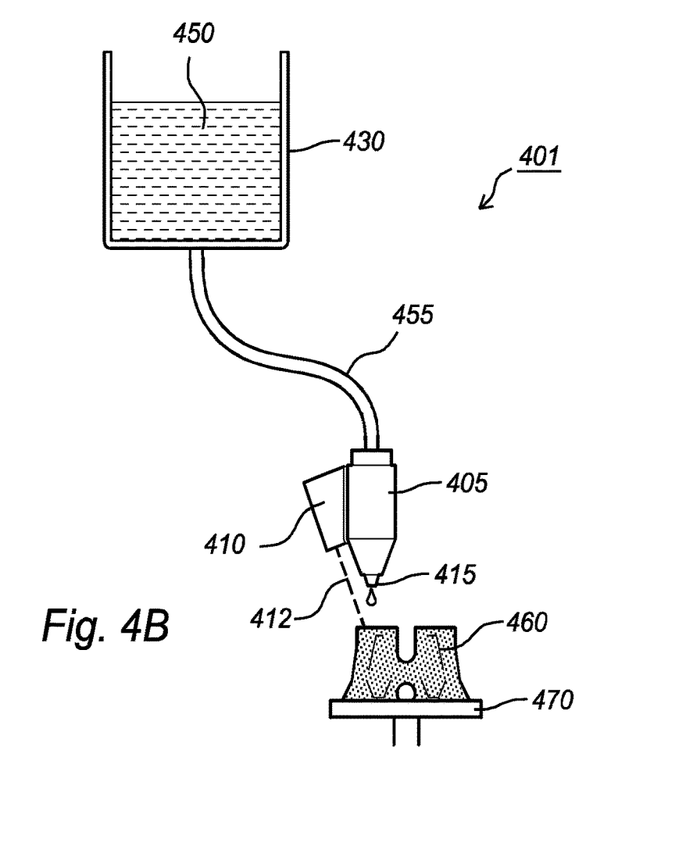
FIG. 4B shows a second embodiment of the additive manufacturing tool in which a liquid resin is dispensed from a dispenser for applying the printed material in the additive manufacturing process.

FIG. 4B shows a second embodiment of the additive manufacturing tool 401 in which a liquid resin 450 is dispensed from a dispenser 405 or print head 405 for applying the printed material 460 in the additive manufacturing process. The additive manufacturing tool 401 shown in FIG. 4b may also constitute the print system 110, 210 as shown in FIGS. 1 and 2. The additive manufacturing tool 401 again comprises the resin container 430 comprising the liquid resin 450 which is fed via a feed 455 towards the print head 405. The print head 405 further comprises a print nozzle 415 from which droplets of liquid resin 450 are emitted towards the printed material 460. These droplets may fall under gravity from the print head 405 to the printed material 460 or may be ejected from the print nozzle 415 using some ejection mechanism (not shown) towards the printed material 460. The print head 405 further comprises a laser 410 emitting a laser beam 412 for immediately cure the droplet of liquid resin 450 when it hits the printed material 460 to fix the droplet of liquid resin 450 to the already printed material 460. The printed material 460 forming a solid object may be located on a platform 470.

Figure 5A:
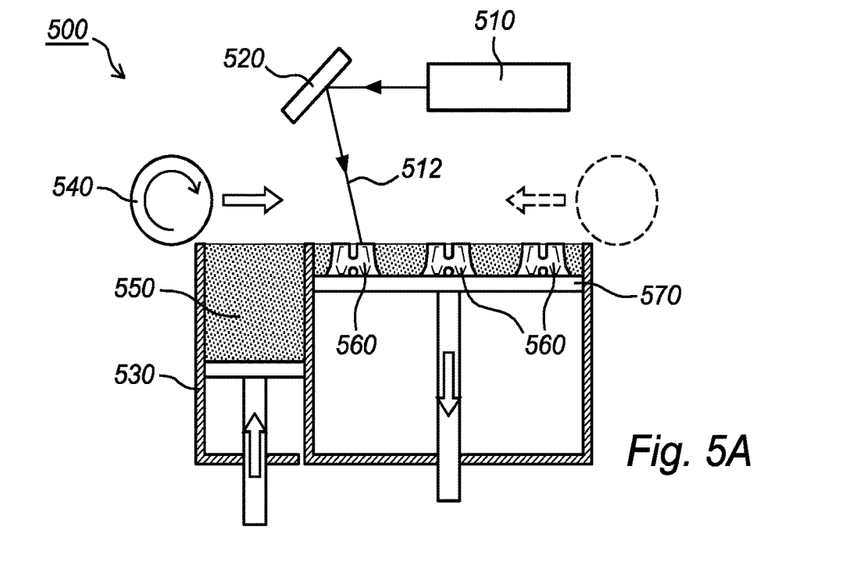
FIG. 5A shows a third embodiment of the additive manufacturing tool in which the material is granulated into small solid particles which are used for applying the printed material in the additive manufacturing process.

FIG. 5A shows a third embodiment of the additive manufacturing tool 500 in which the material is granulated into small solid particles 550 which are used for applying the printed material 560 in the additive manufacturing process. Again, the additive manufacturing tool 500 shown in FIG. 5A may constitute the print system 110, 210 as shown in FIGS. 1 and 2. Now, the additive manufacturing tool 500, also known as a Selective Laser Sintering tool 500, or SLS tool 500 comprises a granulate container 530 comprising the granulated small solid particles 550. The printed material 560 is located again on a platform 570 and is completely surrounded by the granulated small solid particles 550. Lowering the platform allows a granulate feed roller 540 to apply another layer of granulated solid particles 550 on the printed material 560. Subsequently locally applying the laser beam 512 using the laser 510 and the scanning mirror 520 will locally melt the granulated solid particles 550 and connects them with each other and with the printed material 560 to generate the next layer of the solid object to be created. Next, the platform 570 moves down further to allow a next layer of granulated solid particles 550 to be applied via the granulate feed roller 540 to continue the next layer in the additive manufacturing process.

Figure 5B:
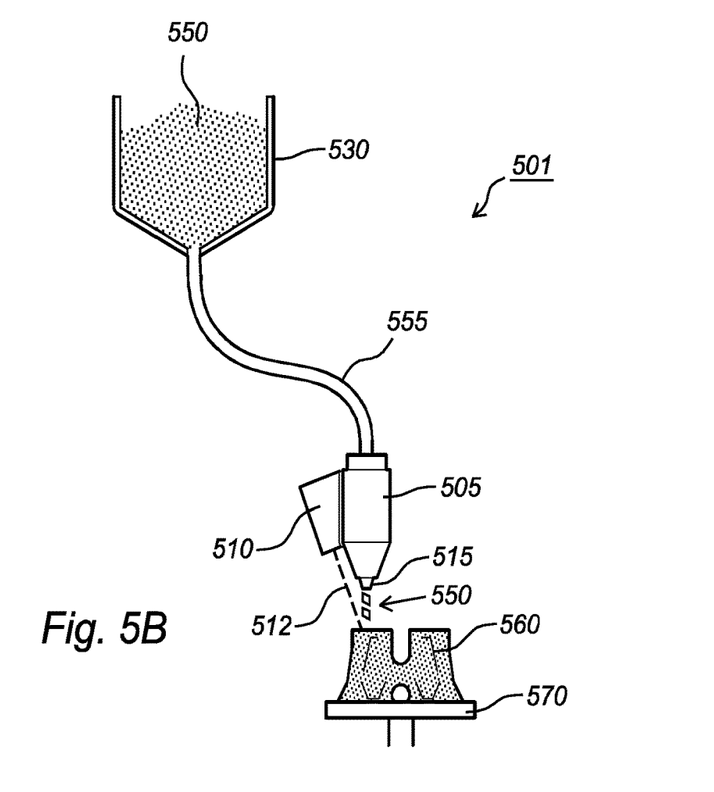
FIG. 5B shows a fourth embodiment of the additive manufacturing tool in which the granulated solid material is dispensed from a dispenser for applying the printed material in the additive manufacturing process.

FIG. 5B shows a fourth embodiment of the additive manufacturing tool 501 or SLS tool 501 in which the granulated solid material 550 is dispensed from a dispenser 505 or print head 505 for applying the printed material 560 in the additive manufacturing process. The additive manufacturing tool 501 shown in FIG. 5B may constitute the print system 110, 210 as shown in FIGS. 1 and 2. The additive manufacturing tool 501 again comprises the granulate container 530 comprising the granulated solid particles 550 which are fed via a feed 555 towards the print head 505. The print head 505 further comprises a print nozzle 515 from which granulated solid particles 550 are emitted towards the printed material 560. These solid particles 550 may fall under gravity from the print head 505 to the printed material 560 or may be ejected from the print nozzle 515 using some ejection mechanism (not shown) towards the printed material 560. The print head 505 further comprises a laser 510 emitting a laser beam 512 for immediately melting or sintering the solid particle 550 when it hits the printed material 560 to fix the solid particle 550 to the already printed material 560. The printed material 560 forming a solid object may be located on a platform 570.

Figure 6:
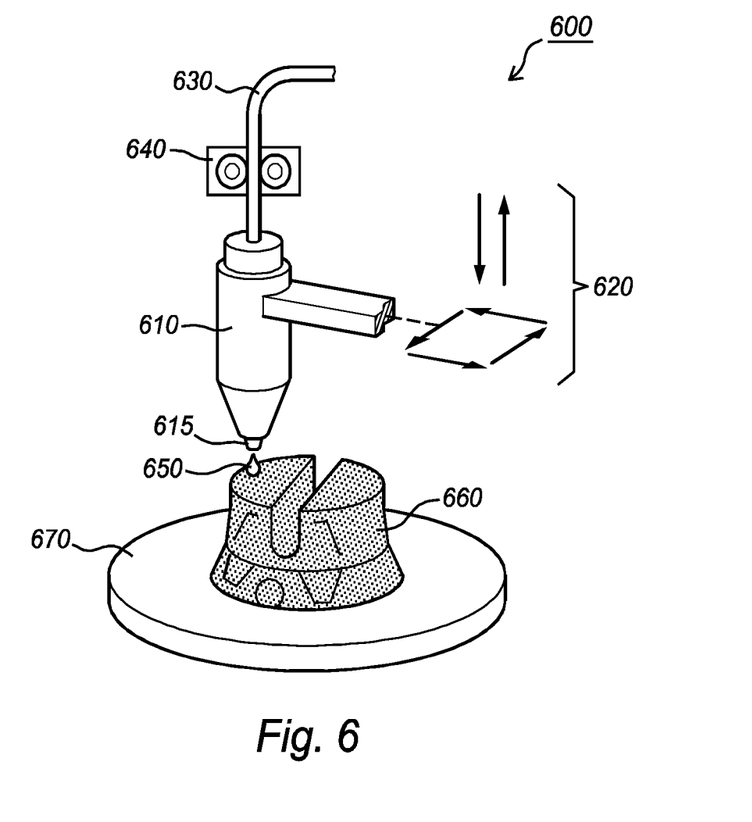
FIG. 6 shows a fifth embodiment of the additive manufacturing tool in which a melted plastic material is dispensed for applying the printed material in the additive manufacturing process, and It should be noted that items which have the same reference numbers in different Figures, have the same structural features and the same functions, or are the same signals. Where the function and/or structure of such an item has been explained, there is no necessity for repeated explanation thereof in the detailed description.

FIG. 6 shows a fifth embodiment of the additive manufacturing tool 600 in which a melted plastic material 650 is dispensed for applying the printed material 660 in the additive manufacturing process. And also the additive manufacturing tool 600 shown in FIG. 6 may constitute the print system 110, 210 as shown in FIGS. 1 and 2. The additive manufacturing tool 600 shown in FIG. 6 is also known as Fused Deposition Modeling tool 600 or FDM tool 600. Now a plastic filament 630 is fed into a dispenser 610 or melter 610 via a filament feeder 640. The dispenser 610 or melter 610 comprises an extrusion nozzle 615 for melting the plastic filament 630 to form a droplet of melted plastic material 650 which is applied to the printed material 660 where it hardens and connects to the already printed material 660. The dispenser 610 may be configured and constructed to apply the droplet of melted plastic 650 to the printed material 660 under gravity or via an ejection mechanism (not shown). The additive manufacturing tool 600 further comprises a positioning system 620 for positioning the dispenser 610 across the printed material 660.

Summarizing, the invention provides a machine 200 for grinding a work-piece 205 using a grinding tool 245. The machine comprises a motor 225 for rotating a spindle 230 comprising a work-piece holder 235 for holding the work-piece 205. The machine further comprising a tool post 240 for mounting and maneuvering the grinding tool relative to the work-piece, wherein the machine further comprises a print system 210 for printing printable material 250 to the work-piece via additive manufacturing. The printed material may be used to customize a shape of the work-piece after the work-piece has been grinded or turned in the machine. This combination allows for a reduced machine footprint and an increased product accuracy.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

| LISTING OF REFERENCE NUMBERS | |
|---|---|
| Machine | 100, 200, 220 |
| Work-piece | 205, 300 |
| Print head | 110, 210, 405, 505 |
| Positioning arm | 115, 215 |
| Motor | 125, 225 |
| Spindle | 230 |
| Work-piece holder | 235 |
| Tool post | 140, 240 |
| Grinding tool | 145, 245 |
| Controller | 270 |
| Angular position sensor | 275 |
| Compartment | 280 |
| Printable material | 250, 450, 550, 650 |
| Printed material | 360, 460, 560, 660 |
| Feed | 255, 455, 555 |
| Inner ring | 300 |
| Raceway surface | 310 |
| Flanges | 360 |
| Additive manufacturing tool | 400, 401 |
| Print head | 405, 505 |
| Print nozzle | 415, 515 |
| Laser | 410, 510 |
| Laser beam | 412, 512 |
| Scanning mirror | 420, 520 |

-continued

| LISTING OF REFERENCE NUMBERS | |
|---|---|
| Resin container | 430 |
| Re-coating bar | 440 |
| Liquid resin | 450 |
| Feed | 455, 555 |
| Platform | 470, 570, 670 |
| SLS-tool | 500, 501 |
| Granulate container | 530 |
| Granulate feed roller | 540 |
| Granulate material | 550 |
| FDM-tool | 600 |
| Melter | 610 |
| Extrusion nozzle | 615 |
| Positioning construction | 620 |
| Filament | 630 |
| Filament feeder | 640 |
| Liquid plastic | 650 |

The invention claimed is:

1. A machine for grinding a work-piece using a grinding tool, the machine comprising:
   a spindle;
   a work-piece holder for holding the work-piece, the work-piece holder assembled to the spindle;
   a motor in rotational engagement with the spindle, wherein a rotational motion of the spindle rotates the work-piece around a center axis during a grinding operation;
   a print system configured and constructed for printing printable material to the work-piece via additive manufacturing, wherein the spindle extends into a printable material container containing the printable material wherein the printable material is presented for performing the additive manufacturing process; the grinding tool, wherein the grinding tool includes at least a surface treatment feature for roughening the surface of the work-piece before applying the printable material to the work-piece; a tool post for mounting and maneuvering the grinding tool relative to the work-piece, the grinding tool being configured and suitable to apply a grinding operation to the work-piece and additive material applied by the print system; and
   a controller programmed to control the motor, the tool post, and the print system in accordance with the following steps:
   upon installation of the work-piece onto the spindle; machining the work-piece to a desired shape;
   preparing the surface of the work-piece for receiving additive material of the print system;
   applying the additive material to the work-piece by the additive manufacturing using the print system;
   maneuvering the tool post to position the grinding tool in conjunction with a rotational motion of the motor to grind the work-piece and additive material to create an annular shaped component, wherein the annular shape of the component is concentric about the center axis.

2. The machine according to claim 1, further comprising a positioning arm for positioning at least a part of the print system relative to the work-piece.

3. The machine according to claim 1, wherein the tool post is further configured and constructed to mount and maneuver at least a part of the print system.

4. The machine according to claim 3, wherein at least a part of the print system is removably attached to the tool post.

5. The machine according to claim 2, wherein the machine is further configured and constructed to position at least a part of the print system vertically above the work-piece for adding the printable material to the work-piece during the grinding operation and printing.

6. The machine according to claim 1, wherein the controller is configured to control the motor and the rotation of the work-piece independent of the additive manufacturing process.

7. The machine according to claim 6, wherein the controller controls the motor for applying a step-wise rotation of the work-piece.

8. The machine according to claim 6, further comprising an angular position sensor in signal communication with the controller, the angular position sensor being adapted to sense an angular position of the work-piece independent of the additive manufacturing.

9. The machine according to claim 1, further comprising a positioning system for positioning at least a part of the print system relative to the work-piece.

10. The machine according to claim 1, further comprising a compartment for generating a controlled environment inside the compartment,
   wherein at least a part of the print system is located in the compartment enabling the additive manufacturing application to the work-piece to be accomplished within the controlled environment.

11. The machine-according to claim 1, further comprising a container containing the printable material, the container being configured and constructed for immersing the work-piece at least partially with the printable material.

12. The machine according to claim 1, wherein the controller is configured and constructed for controlling the printing of the print system and for controlling a positioning of at least a part of the print system relative to the work-piece.

13. The machine according to claim 1, further comprising surface treatment means for at least one of:
   cleaning a surface of the work-piece prior to applying the printable material, roughening the surface of the work-piece prior to applying the printable material to the work-piece, and
   coating at least a part of the surface of the work-piece prior to applying the printable material.

14. The machine according to claim 1, further comprising a feed for providing the printable material to the print head.

15. The machine-according to claim 1, wherein the print system is configured for applying the additive manufacturing selected from a list comprising stereo-lithography, selective laser sintering, selective laser melting, laminated object manufacturing, fused deposition modeling, selective binding, laser engineering net shaping, photo polymerization, direct laser deposition and selective electron beam sintering.

16. The machine according to claim 1, wherein the machine is configured and constructed for applying one of a hard-turning or a hard-boring process to the work-piece.

17. The machine according to claim 1, wherein the print system is configured for printing printable material chosen from a list comprising: steel, stainless steel, maraging steel, tool steel, low alloy steel, copper alloys, nickel alloys, cobalt alloys, aluminum, aluminum alloys, titanium, titanium alloys.

18. The machine according to claim 1, wherein the motor is capable of rotating at a high speed and a very low speed, the machine further comprising:
   an first angular position sensor that is accurate at the high speed; and
   a second angular position sensor that is accurate at the very low speed, wherein the first angular position sensor is arranged to determine an angular position of the tool post,
wherein the second angular position sensor is arranged to determine the angular position of the tool post.

* * * * *